United States Patent
Gelineau et al.

(10) Patent No.: US 9,761,113 B1
(45) Date of Patent: Sep. 12, 2017

(54) LIGHT CURTAIN PROTECTION SYSTEM FEATURING A PASSIVE OPTICAL MODULE

(71) Applicant: Banner Engineering Corp., Plymouth, MN (US)

(72) Inventors: Matthew Gelineau, Blaine, MN (US); Curtis Rosenow, Plymouth, MN (US)

(73) Assignee: Banner Engineering Corp., Plymouth, MN (US)

( * ) Notice: Subject to any disclaimer, the term of this patent is extended or adjusted under 35 U.S.C. 154(b) by 0 days.

(21) Appl. No.: 15/215,332

(22) Filed: Jul. 20, 2016

(51) Int. Cl.
*G08B 21/22* (2006.01)
*G08B 21/18* (2006.01)
*G01V 8/22* (2006.01)

(52) U.S. Cl.
CPC ............ *G08B 21/22* (2013.01); *G01V 8/22* (2013.01); *G08B 21/182* (2013.01)

(58) Field of Classification Search
CPC ........ G08B 21/22; G08B 21/182; G01V 8/22; G01V 8/10–8/26; F16P 3/144; E05G 5/003; E05Y 2900/132
See application file for complete search history.

(56) References Cited

U.S. PATENT DOCUMENTS

| | | | | |
|---|---|---|---|---|
| 3,885,162 A | * | 5/1975 | Geertz | G01N 21/534 250/216 |
| 4,224,608 A | * | 9/1980 | Lederer | G08B 13/184 250/221 |
| 4,339,660 A | * | 7/1982 | Buchholz | G01S 7/499 250/221 |
| 5,077,747 A | | 12/1991 | Hemmer et al. | |
| 5,302,835 A | * | 4/1994 | Bendett | G01S 7/499 250/559.09 |
| 5,739,526 A | | 4/1998 | Furstenau et al. | |
| 6,084,662 A | | 7/2000 | Seaburn | |
| 6,130,421 A | * | 10/2000 | Bechtel | B60Q 1/1423 250/208.1 |
| 6,316,762 B1 | * | 11/2001 | Argast | G01J 4/04 250/214 R |

(Continued)

FOREIGN PATENT DOCUMENTS

EP 0493432 B1 7/2005
EP 2508920 A1 10/2012

*Primary Examiner* — Nay Tun
(74) *Attorney, Agent, or Firm* — Craige Thompson; Thompson Patent Law

(57) ABSTRACT

Apparatus and associated methods relate to a light curtain protection system having a passive optical module arranged to receive, from an active optical module, a light signal such that a reflector reflects, through a polarization control module, the light signal to be received by a receiver in the active optical module. In an illustrative example, the polarization control module includes a half-wave plate aligned with the reflector to impart a first predetermined polarization to the reflected light signal such that the reflected light signal corresponds to a second predetermined polarization when received by the receiver. The polarization control module includes optical elements, such as, for example, a linear polarizer, to receive the reflected light such that the optical elements polarizes the received reflected light signal to correspond to a predetermined polarization. In some examples, the light curtain protection system may advantageously require operating power only for the active optical module.

18 Claims, 7 Drawing Sheets

(56) References Cited

U.S. PATENT DOCUMENTS

| | | | | |
|---|---|---|---|---|
| 6,353,489 B1 * | 3/2002 | Popovich | ............... | G02B 5/09 |
| | | | | 359/15 |
| 6,507,441 B1 * | 1/2003 | Eisenberg | ............ | G02B 3/0056 |
| | | | | 359/619 |
| 6,927,386 B2 | 8/2005 | Iwamoto et al. | | |
| 7,872,746 B2 * | 1/2011 | Gao | ................... | A61M 1/0023 |
| | | | | 356/246 |
| 7,936,450 B2 | 5/2011 | Hoersch et al. | | |
| 2003/0138131 A1 * | 7/2003 | Stam | ..................... | B60Q 1/085 |
| | | | | 382/104 |
| 2004/0246583 A1 | 12/2004 | Mueller et al. | | |
| 2007/0146583 A1 | 6/2007 | Dreher et al. | | |
| 2012/0256096 A1 | 10/2012 | Heimlicher et al. | | |
| 2013/0214167 A1 * | 8/2013 | Grinberg | ............. | H04N 17/002 |
| | | | | 250/353 |
| 2015/0109618 A1 | 4/2015 | Howell et al. | | |
| 2016/0327639 A1 * | 11/2016 | Albert | ................... | F16P 3/144 |

\* cited by examiner

LIGHT CURTAIN PROTECTION SYSTEM FEATURING A PASSIVE OPTICAL MODULE

TECHNICAL FIELD

Various embodiments relate generally to light curtains.

BACKGROUND

Manufacturing equipment of various types (e.g., robots, conveyor belts, rapid manufacturing automated assembly, mechanical presses) have the potential to cause injury to personnel. The manufacturing equipment may be operated by electrical actuators, hydraulic actuators, or pneumatic actuators. The actuations performed by the manufacturing equipment during operations may cause injury to workers.

To promote safety around such manufacturing equipment, various safety systems may be used. Various techniques may be used by the safety systems. A safety system may monitor an area around manufacturing equipment. Another safety system may monitor object elevations from the floor with respect to manufacturing equipment to determine a safety condition for operating the manufacturing equipment. For example, a detection system may be installed to detect whether an object or person enters a potentially dangerous area.

Safety systems use a variety of operating principles to provide protection. Some safety systems may use pressure mats to detect whether a person or object is at a specific location. Optical detection systems may use light to detect the presence of a person or an object.

SUMMARY

Apparatus and associated methods relate to a light curtain protection system having a passive optical module arranged to receive, from an active optical module, a light signal such that a reflector reflects, through a polarization control module, the light signal to be received by a receiver in the active optical module. In an illustrative example, the polarization control module includes a half-wave plate aligned with the reflector to impart a first predetermined polarization to the reflected light signal such that the reflected light signal corresponds to a second predetermined polarization when received by the receiver. The polarization control module includes optical elements, such as, for example, a linear polarizer, to receive the reflected light such that the optical elements polarizes the received reflected light signal to correspond to a predetermined polarization. In some examples, the light curtain protection system may advantageously require operating power only for the active optical module.

In an illustrative example, the polarization control module includes a half-wave plate aligned with the mirror to receive the reflected light signal from the reflector. The polarization control module further includes a linear polarizer aligned with the half-wave plate to receive the reflected light through the half-wave plate such that the linear polarizer polarizes the received reflected light towards the receiver in accordance with a predetermined polarization.

Apparatus and associated methods relate to a light curtain protection system having a passive optical module arranged to receive, from an active optical module, a light signal such that a retroreflector reflects, through a collimating lens and an optical aperture, the light signal to be received by a receiver in the active optical module. In an illustrative example, the passive optical barrier includes an optical barrier having the optical aperture such that a baffle, coupled to the collimating lens, houses the retroreflector and the optical barrier. The passive optical module may align with the active optical module such that an emitter in the active optical module projects the light signals towards the passive optical module and the receiver captures the reflected light signals from the passive optical module. In some examples, the light curtain protection system may advantageously require operating power only for the active optical module.

Various embodiments may achieve one or more advantages. For example, some embodiments may permit a user to install the light curtain protection system in an area with limited wiring availability because only the active optical module may require operating power. As such, the passive optical module may be installed in an area where operating power is not available. A user may enjoy more flexibility when identifying an installation site for the light curtain protection system because of the passive optical module. For example, the user may avoid the installation cost associated with providing an area with electrical wiring. The flexibility provided by the passive optical module may permit the use of light curtain technology in environments where light curtains may not have been viable options. Such an environment may be a small assembly manufacturing facility where adding wiring to an area may be cost-prohibitive or structurally infeasible.

In some embodiments, the manufacturing of the light curtain protection system may decrease in cost due to fewer electrical components being required to assemble the light curtain protection system. The light curtain protection system may provide a low-cost alternative to a traditional light curtain system. In some embodiments, the light curtain protection system may reduce maintenance costs in the event that only the passive optical module needs to be replaced.

The active optical module and the passive optical module may include linear polarizers, which may, for example, increase the reliability when detecting an obstruction. In some embodiments, linear polarizers may be placed along an incident path (e.g., from active optical module to passive optical module) and along a return path (e.g., from passive optical module to active optical module). As such the linear polarizers may only allow a light signal with a specific orientation to pass through thereby reducing adverse effects of ambient light and objects with reflective surfaces.

In various embodiments, the active optical module may include detection circuitry. The detection circuitry may perform functions and instructions for evaluating received light signals to increase the reliability of the light curtain protection system. For example, the detection circuitry may include program instructions for determining light signal characteristics. The light signal characteristics may include time of flight, amplitude, or modulation frequency, for example. In some embodiments, the passive optical module may include a pair of collimating lenses and a pair of reflective surfaces, such as mirrors.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 3:
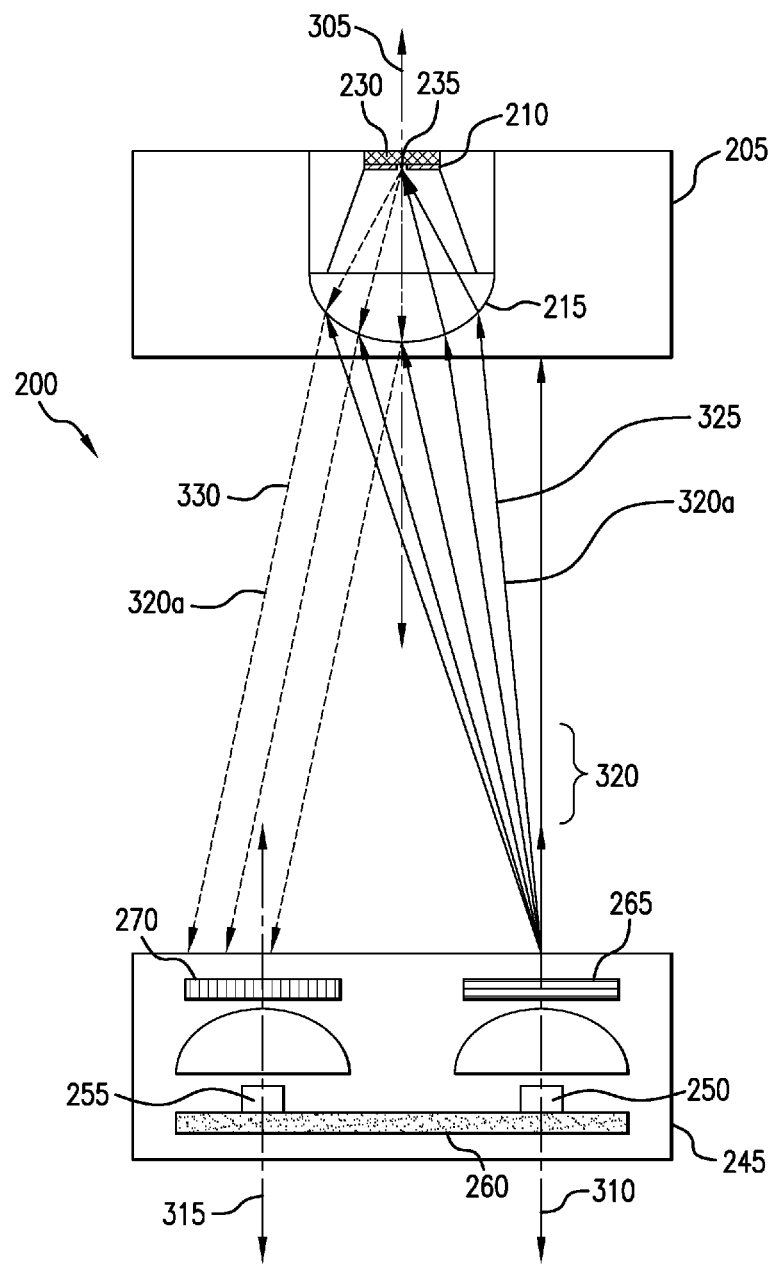
FIG. 3 depicts an operation of an exemplary light beam detection system.
Figure 4:
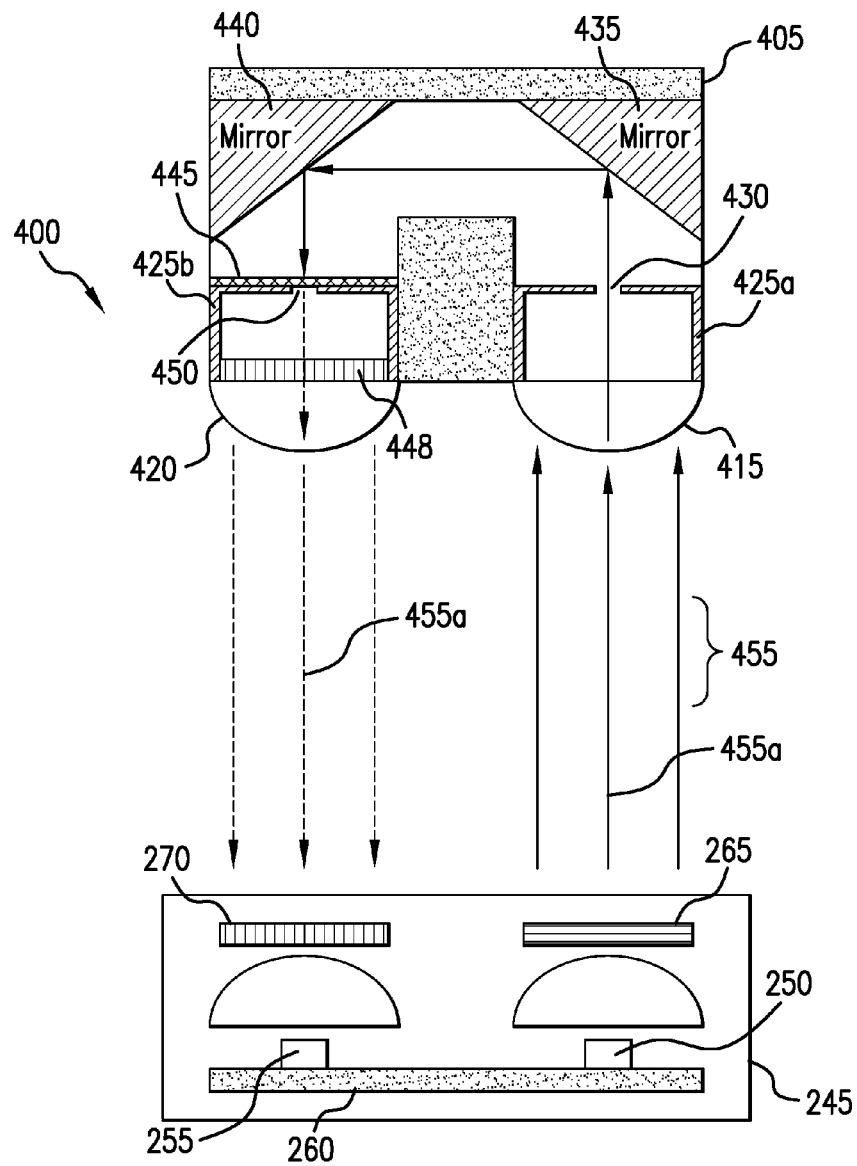
FIG. 4 depicts an exemplary light curtain protection system using a polarization control module.
Figure 5:
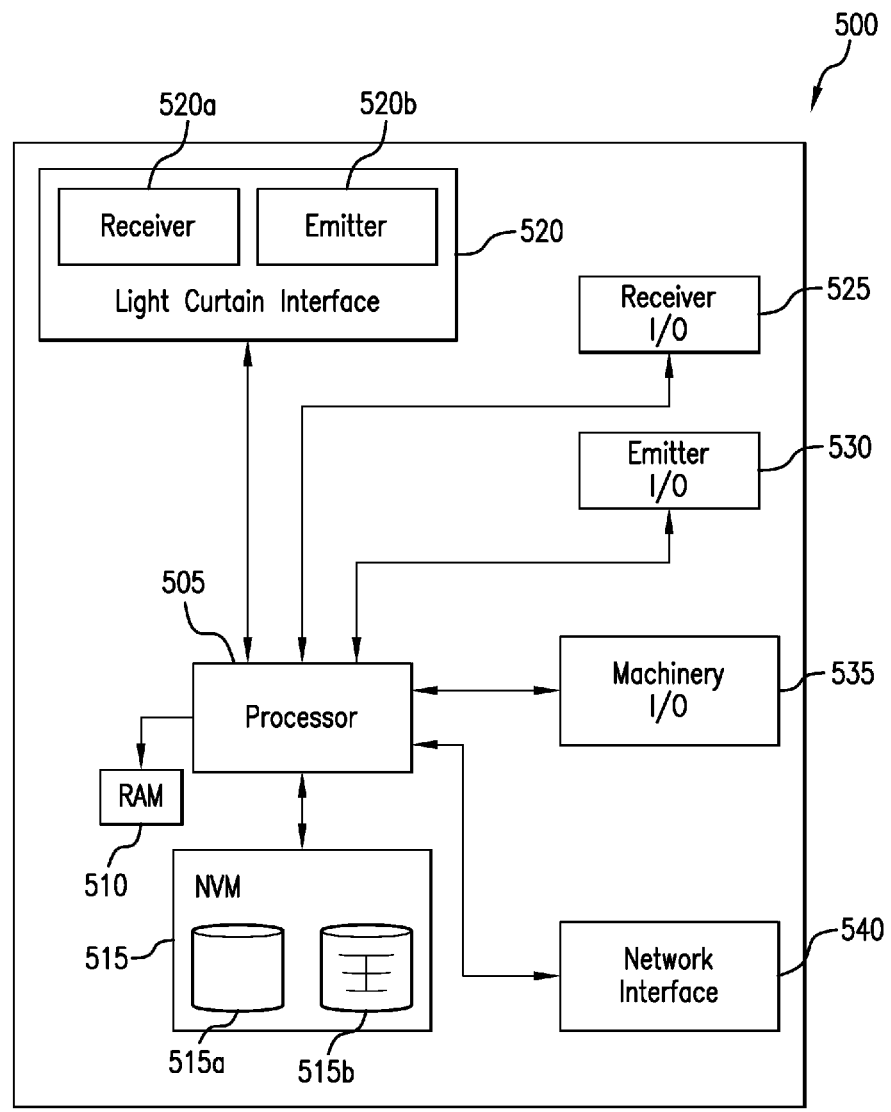
FIG. 5 depicts a controller system for an exemplary light curtain protection system.

To aid understanding, this document is organized as follows. First, an exemplary light curtain protection system in a manufacturing environment is briefly introduced with reference to FIG. 1. Second, with reference to FIGS. 2A-2B, the discussion turns to exemplary embodiments that illustrate the composition and structure of an exemplary passive optical module and an exemplary active optical module. Specifically, the arrangement of optical components for achieving an exemplary light curtain protection system. With reference to FIGS. 3-4, exemplary embodiments of the light curtain protection system are discussed. With reference to FIG. 5, a controller system for an exemplary light curtain protection system is introduced. Finally, with reference to FIGS. 6-7, exemplary methods for initializing the light curtain protection system and an exemplary method for a detection mode of the light curtain protection system are discussed.

Figure 1:
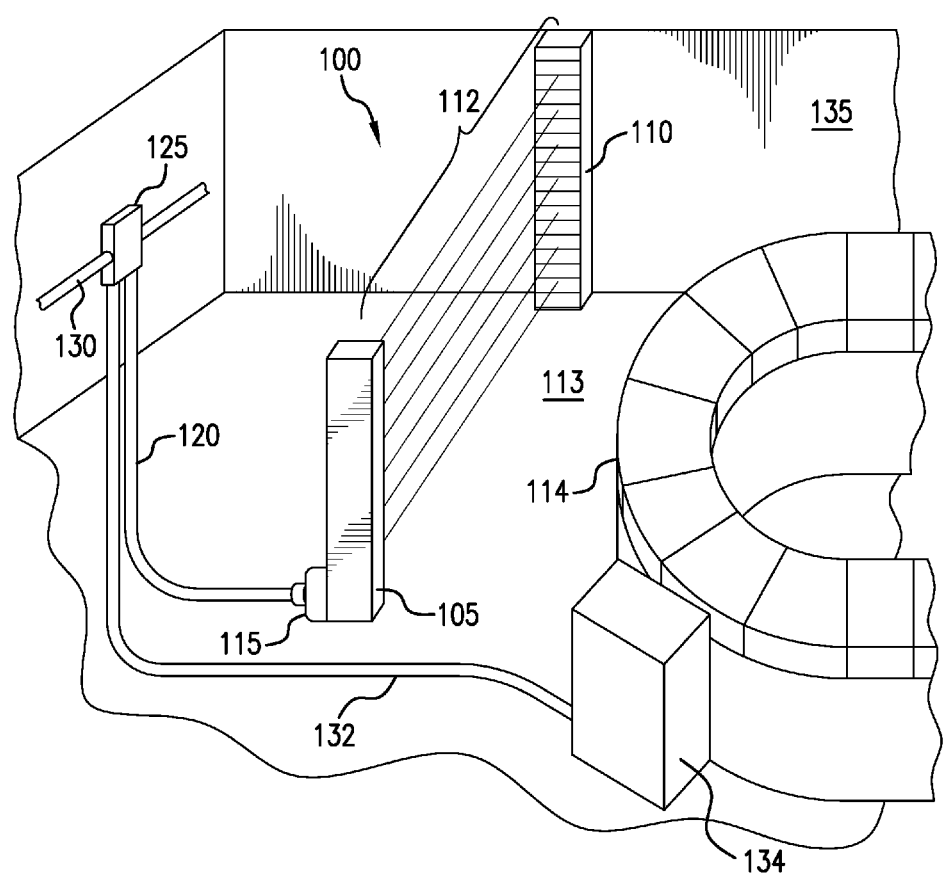
FIG. 1 depicts a perspective view of an exemplary light curtain protection system in a manufacturing environment.

FIG. 1 depicts a perspective view of an exemplary light curtain protection system in a manufacturing environment. A light curtain protection system 100 includes an active optical module 105 and a passive optical module 110. The active optical module 105 and the passive optical module 110 optically align with each other such that a light stream 112 forms an optical field of view between the active optical module 105 and the passive optical module 110. The light stream 112 protects an area 113 near industrial machinery 114. As depicted, the passive optical module 110 resides along a wall 135 having no electrical wiring. In some embodiments, the passive optical module 110 may permit the installation of the light curtain protection system 100 in an area lacking electrical wiring. As such, a user installing a light curtain protection system 100 may have more flexibility when selecting an installation location because electrical wiring would not be required for the passive optical module 110.

The active optical module 105 includes an electrical connection interface 115. A wire 120 electrically connects, via the electrical connection interface 115, the active optical module 105 to an electrical device 125. The electrical device 125 releasably mounts to a DIN rail 130. In an illustrative example, the electrical device 125 may be a safety controller. The electrical device 125 electrically connects, via wire 132, to a machinery operations station 134. In various embodiments, the active optical module 105 may receive operating instructions from the electrical device 125 via the electrical connection interface 115. For example, the active optical module 105 may be powered "ON" by the electrical device 125.

The electrical device 125 may receive, from the active optical module 105, an alert signal indicating that an obstruction has been detected in the optical field of view defined by the light stream 112. In response to the received alert, the electrical device 125 may initiate an emergency stop of the machinery 114, via the machinery operations station 134, to prevent the obstruction from contacting the machinery 114 during operation. In an illustrative example, the obstruction may be a person.

Figure 2A:
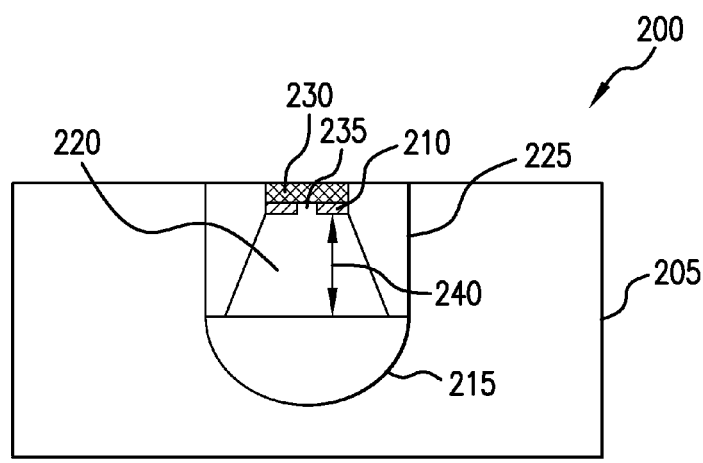
FIG. 2A depicts a top view cross-section of an exemplary passive optical module.

FIG. 2A depicts a top view cross-section of an exemplary passive optical module. A passive optical module 205 includes a polarization control module formed, as depicted, by a collimating lens 215. The passive optical module 205 of a light curtain protection system 200 includes an optical barrier 210 disposed opposite the collimating lens 215 defining the optical guidance cavity 220 within the baffle 225. As depicted, a retroreflector 230 aligns with the optical aperture 235 such that the retroreflector 230 is accessible via the optical barrier 210 through the optical aperture 235. The retroreflector 230 may comprise a corner cube reflector or a plurality of corner cube reflectors. In various embodiments, retroreflector 230 may comprise a reflective tape to decrease the thickness of the passive optical module 205. The reflective tape may provide a greater flexibility during the construction of the passive optical module 205 as the reflective tape may not require a specific orientation. In various embodiments, the retroreflector 230 may be partially disposed within the optical aperture 235. In some embodiments, the optical aperture 235 may be circular or elliptical. For example, an elliptical aperture may be used in conjunction with an elliptical lens whereas a circular aperture may be used in conjunction with a circular lens. In various embodiments, the optical aperture 235 may be substantially square or rectangular.

A focal length 240 corresponding to the distance between the collimating lens 215 and the optical barrier 210, along with the position and size of the optical aperture 235, define a critical angle (not shown) such that light entering the collimating lens 215 at an angle less than the critical angle may propagate through the optical aperture 235 while light entering the collimating lens 215 at an angle greater than the critical angle may not. The critical angle may prevent a light signal from a source other than a corresponding emitter to affect the system's ability to accurately detect an object in the field of view. The object detection size may be defined as the minimum diameter object that will consistently generate an alert signal indicating that an obstruction has been detected in the optical field of view as the obstruction may geometrically restrict the light path. For example, in the event of a reflective material, the obstruction may alter the optical path of a reflected incident lighting.

In various embodiments, the baffle 225 may be constructed from a non-reflective material such that any light contacting the baffle 225 does not reflect within the optical guidance cavity 220. The optical barrier 210 may also be constructed from an opaque, non-reflective material.

Figure 2B:
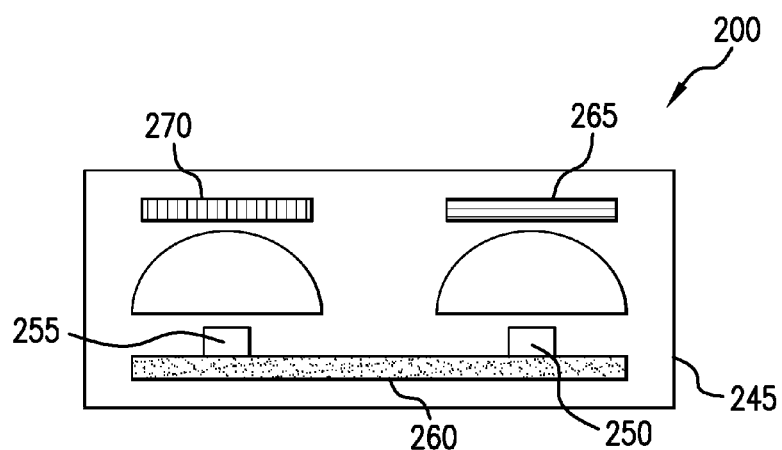
FIG. 2B depicts a top view cross-section of an exemplary active optical module.

FIG. 2B depicts a top view cross-section of an exemplary active optical module. An active optical module 245 of the light curtain protection system 200 includes an emitter 250 and a receiver 255. The emitter 250 and the receiver 255 electrically connect to a transceiver interface 260. As depicted, the emitter 250 and the receiver 255 form a transceiving pair. The active optical module 245 includes a linear polarizer 265 disposed along an incident path (described below in FIG. 3) such that a light signal transmitted by the emitter 250 travels through the linear polarizer 265. As depicted, the linear polarizer 265 causes horizontal polarization. The linear polarizer 265 may effectively polarize the light signal, in effect, reducing scatter for the incident light. The active optical module 245 includes a linear polarizer 270 disposed along a return path (described below in FIG. 3) such that a light signal received by the receiver 255 travels through the linear polarizer 270. As depicted, the linear polarizer 270 imparts vertical polarization.

In some embodiments, the emitter 250 and the receiver 255 may be horizontally adjacent to each other. As such, the active optical module 245 may include a row of emitters and a row of receivers. Each emitter and each receiver horizontally adjacent to each other may form a transceiving pair. The emitter may be a photoemitter. The receiver may be a photoreceiver. In various embodiments, the linear polarizer 265 may cause vertical polarization while the linear polarizer 270 may cause horizontal polarization. With reference to FIG. 1, the transceiver interface 260 may include circuitry to transmit and receive electrical signals, via the electrical connection interface 115, to the electrical device 125.

FIG. 3 depicts an operation of an exemplary light beam detection system. In this example, the light curtain protection system 200 includes a passive optical module 205 and an active optical module 245. As depicted, a passive optical axis 305 is defined as an axis substantially centered in the passive optical module 205 such that the axis travels through the optical aperture 235 and the vertex of the collimating lens 215. An axis 310 extends substantially through the center of the emitter 250. An axis 315 extends substantially through the center of the receiver 255. As depicted, the passive optical axis 305 is substantially centered between the emitter axis 310 and the receiver axis 315. The spatial relationship of the axes 305-315 may align the passive optical module 205 and the active optical module 245 to maximize the capture of light signals 320 while the light curtain protection system 200 operates.

The emitter 250 transmits a plurality of incident light signals 320 forming a light stream. Each light signal 320 travels along its own incident path. For example, a light signal 320a travels along an incident path 325 towards the collimating lens 215. The active optical module 245 includes the linear polarizer 265 disposed along the incident path 325. As depicted, the linear polarizer 265 horizontally polarizes the incident light signals 320 transmitted by the emitter. The collimating lens 215, arranged within the passive optical module 205 near an edge of the passive optical module 205 nearest the active optical module 245, receives some of the light signals 320.

In response to receiving the light signal 320a, for example, the collimating lens 215 focuses the light signal 320a into the optical aperture 235 towards the retroreflector 230. The retroreflector 230 reflects the light signal 320a through the optical aperture 235 towards the collimating lens 215. In response to receiving the reflected light signal 320a, the collimating lens 215 collimates the reflected light signal 320a along a return path 330 towards the receiver 255. The active optical module 245 includes a linear polarizer 270 disposed along a return path 330 through which the reflected light signal 320a passes before reaching the receiver 255. As depicted, the linear polarizer 270 vertically polarizes the reflected incident light signal 320a.

The linear polarizers 265, 270 may be used by the light curtain protection system 200 to modulate the intensity of the light signals 320. For example, in some embodiments, the linear polarizers 265, 270 may be arranged within the active optical module 245 such that the linear polarizers 265, 270 may rotate within the active optical module 245. The linear polarizers 265, 270 may electrically connect to the transceiving interface 260 such that the transceiving interface 260 may cause the linear polarizers 265, 270 to rotate in accordance with one or more predetermined polarization criteria. The predetermined polarization criteria may be stored in memory (described below in FIG. 5) or may be received, with reference to FIG. 1, via the electrical connection interface 115.

FIG. 4 depicts an exemplary light curtain protection system using a polarization control module. The light curtain protection system 400 includes a passive optical module 405 and the active optical module 245. The passive optical module 405 includes a polarization control module formed, as depicted, by a collimating lens 420, a half-wave plate 445, and a linear polarizer 448 to polarize a light signal 455a in accordance with a first predetermined polarization to the reflected light signal 455a such that the reflected light signal 455a received by the receiver 255 corresponds to a second predetermined polarization.

The passive optical module includes a collimating lens 415 aligned with a baffle 425a such that a mirror 435 may receive the light signal 455a through the optical aperture 430. The mirror 435 is arranged within the passive optical module 405 to reflect the light signal 455a at a substantially right angle towards the mirror 440. The mirror 440 is arranged to reflect the light signal 455a, through the half-wave plate 445 and an optical aperture 450, towards a baffle 425b. The mirrors 435, 440, as depicted, are substantially 45-degree surfaces. From the baffle 425b, the light signal 455a travels through the linear polarizer 448 towards the collimating lens 420.

The emitter 250 transmits light signals 455 through the linear polarizer 265 towards the collimating lens 415. The linear polarizer 265 horizontally polarizes the light signals 455 towards the collimating lens 415. As depicted, the horizontally polarized light signal 455a enters, via the collimating lens 415, the passive optical module 405 and passes through the optical aperture 430 where the mirror 435 reflects the horizontally polarized light signal 455a towards the mirror 440. The half-wave plate 445 receives the reflected horizontally polarized light signal 455a from the mirror 440. The half-wave plate may have a fast axis defined as 45 degrees from the incident horizontally polarized light signal 455a to rotate the polarization of the horizontally polarized light signal 455a by 90 degrees. The linear polarizer 448 receives, via the optical aperture 450, the light signal 455a from the half-wave plate 445. The linear polarizer 448 may ensure that only light signals 455 oriented in the correct plane may exit, via the collimating lens 420, the passive optical module 405. The receiver 255 receives, through the linear polarizer 270, the light signal 455a after the light signal 455a exits the passive optical module 405.

In some embodiments, the mirrors 435, 440 may comprise reflective materials such as reflective tapes, tiles or plastics. In various embodiments, the shape of the mirrors, 435, 440 may be modified to achieve a predetermined intensity and field of view. For example, a spherical surface of the mirror 435, 440 may increase the focusing power of the light signals 455. A parabolic or hyperbolic surface may further alter a desired intensity of the light signals 455. In various embodiments, the passive optical module 405 may not include the linear polarizer 448. In various embodiments, the passive optical module 405 may not include the collimating lenses 415, 420 and optical apertures 425. The half-wave plate 445 may be partially disposed within the optical aperture 450.

FIG. 5 depicts a controller system for an exemplary light curtain protection system. The light controller system 500 includes a processor 505 operably connected to random-access-memory (RAM) 510 and non-volatile memory (NVM) 515. In an illustrative example, the light controller system 500 may reside within an active optical module such as, with reference to FIG. 3, the active optical module 245, for example. The NVM 515 includes data stores 515a, 515b. The processor 505 operably connects to a light curtain interface 520. As depicted, the light curtain interface includes a receiver module 520a and an emitter module 520b. The receiver module 520a may operably connect to a plurality of receivers disposed in an active optical module while the emitter module 520b may operably connect to a plurality of emitters disposed in the active optical module. In some embodiments, the receiver module 520a and the emitter module 520b may execute self-diagnostic instructions to determine that the plurality of receivers and the plurality of emitters function appropriately. The self-diagnostic instructions may be stored in the data store 515a and retrieved by the processor 505 when, with reference to FIG. 3, the light curtain protection system 200 initiates.

The processor 505 operably connects to a receiver I/O 525 and an emitter I/O 530. The processor 505 may receive from the receiver I/O 525 information regarding characteristics (e.g., amplitude) of a light signal received from a receiver. The processor 505 may receive from the emitter I/O 530 information regarding characteristics (e.g., pulse signature) of an incident light signal transmitted from an emitter. In some embodiments, the processor 505 may determine, in accordance with program instructions stored in the data store 515a, a time of flight (TOF). For example, the processor 505 may store, in the data store 515b, a transmission time defined as the time the emitter transmits an incident light signal. The processor 505 may receive, from the receiver I/O 525, an arrival time of the reflected light signal such that the processor 505 may determine a TOF by comparing the stored transmission time and the received arrival time.

The processor 505 operably connects to a machinery output interface 535. The machinery output interface 535 may be electrically connected to a machinery operations station such as, with reference to FIG. 1, machinery operations station 134. In various embodiments, the machinery output interface 535 may operably connect to the electrical device 125. The processor 505 operably connects to a network interface 540. The network interface 540 may operably connect to a networked device such as, for example, a remote computer. The processor 505 may receive, via the network interface 540, one or more predetermined criteria (e.g., predetermined TOF) to store in the data store 515b. The processor 505 may use the stored predetermined criteria as a threshold to be compared against characteristics of a received light signal. In various embodiments, the network interface 540 may be wireless such that an electronic mobile device (e.g., smartphone) may transmit program instructions and/or predetermined criteria. In some embodiments, the processor 505 may transmit, via the network interface 540, a status to the electronic mobile device.

Figure 6:
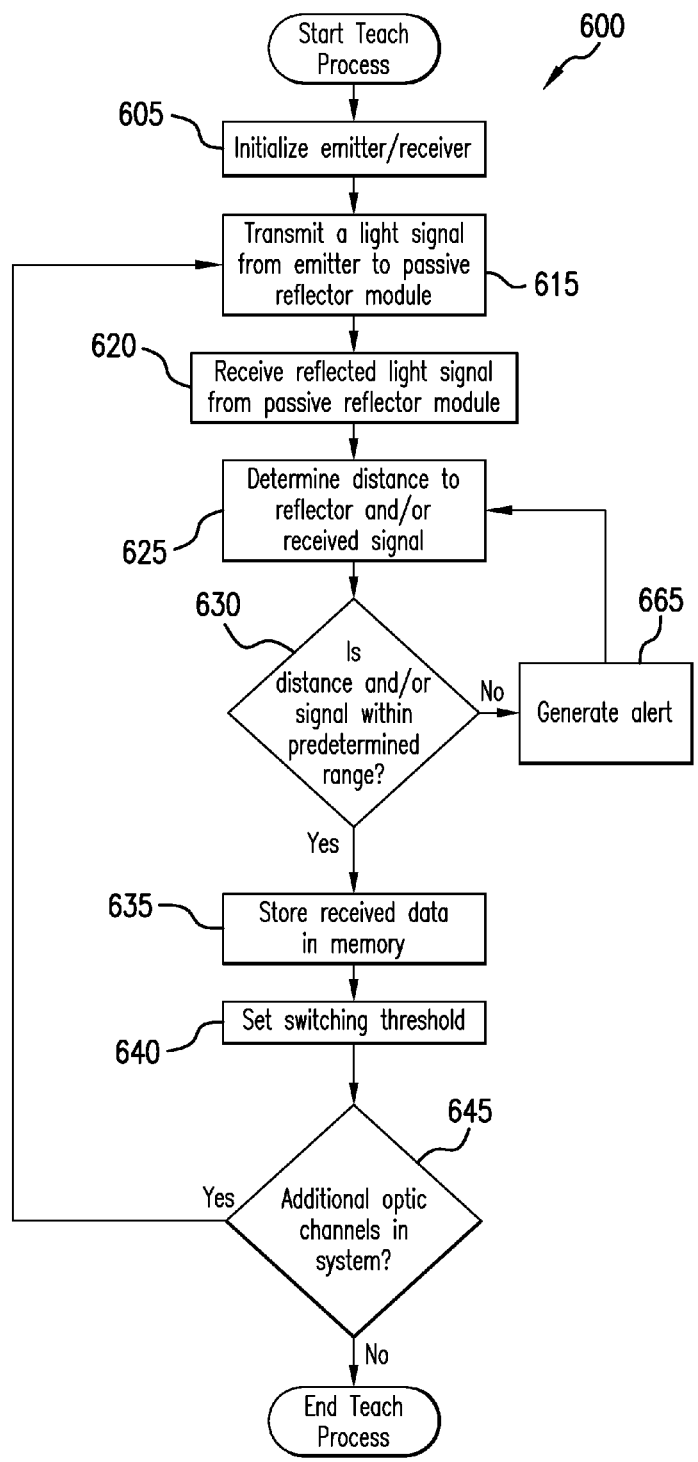
FIG. 6 depicts a flowchart of a teach process for an exemplary light curtain protection system.

FIG. 6 depicts a flowchart of a teach process for an exemplary light curtain protection system. The method 600 begins, at 605, when the active optical module 245 (with reference to FIG. 3) initializes the emitter 250 and the receiver 255. With reference to FIG. 5, the processor 505 of the active optical module 245 transmits, at 615, a light signal to the passive reflector module 205. In an illustrative example, the processor 505 may determine, via predetermined criteria stored in the NVM 515, or in accordance with predetermined criteria received via the network interface 540, a light signal intensity to transmit to the passive reflector module 205. At 620, the active optical module 245 receives, via the receiver 255, a reflected light signal from the passive optical module 205. The processor 505 determines, at 625, a distance to the reflector based on TOF or the intensity of the reflected light signal. In various embodiments, the processor 505 may determine either the distance to the reflector or the intensity of the reflected light signal or both.

The processor 505 determines, at 630, whether the determined distance to the reflector and/or the determined intensity of the reflected light signal are within a predetermined range. If, at 630, the processor 505 determines that the determined distance to the reflector and/or the determined intensity of the reflected light signal are not within a predetermined range, the processor 505, at 665, generates an alert before repeating step 625.

If, at 630, the processor 505 determines that the determined distance to the reflector and/or the determined intensity of the reflected light signal are within a predetermined range, the processor 505 stores, at 635, the determined distance to the reflector and the determined intensity of the reflected light signal in NVM 515. At 640, the processor 505 sets a switching threshold. At 645, the processor 505 determines whether the system includes additional optic channels. If, at 645, the processor 505 determines that the system does not include additional optic channels, the teach process ends. If, at 645, the processor 505 determines that the system does include additional optic channels, the teach process returns to step 615.

Figure 7:
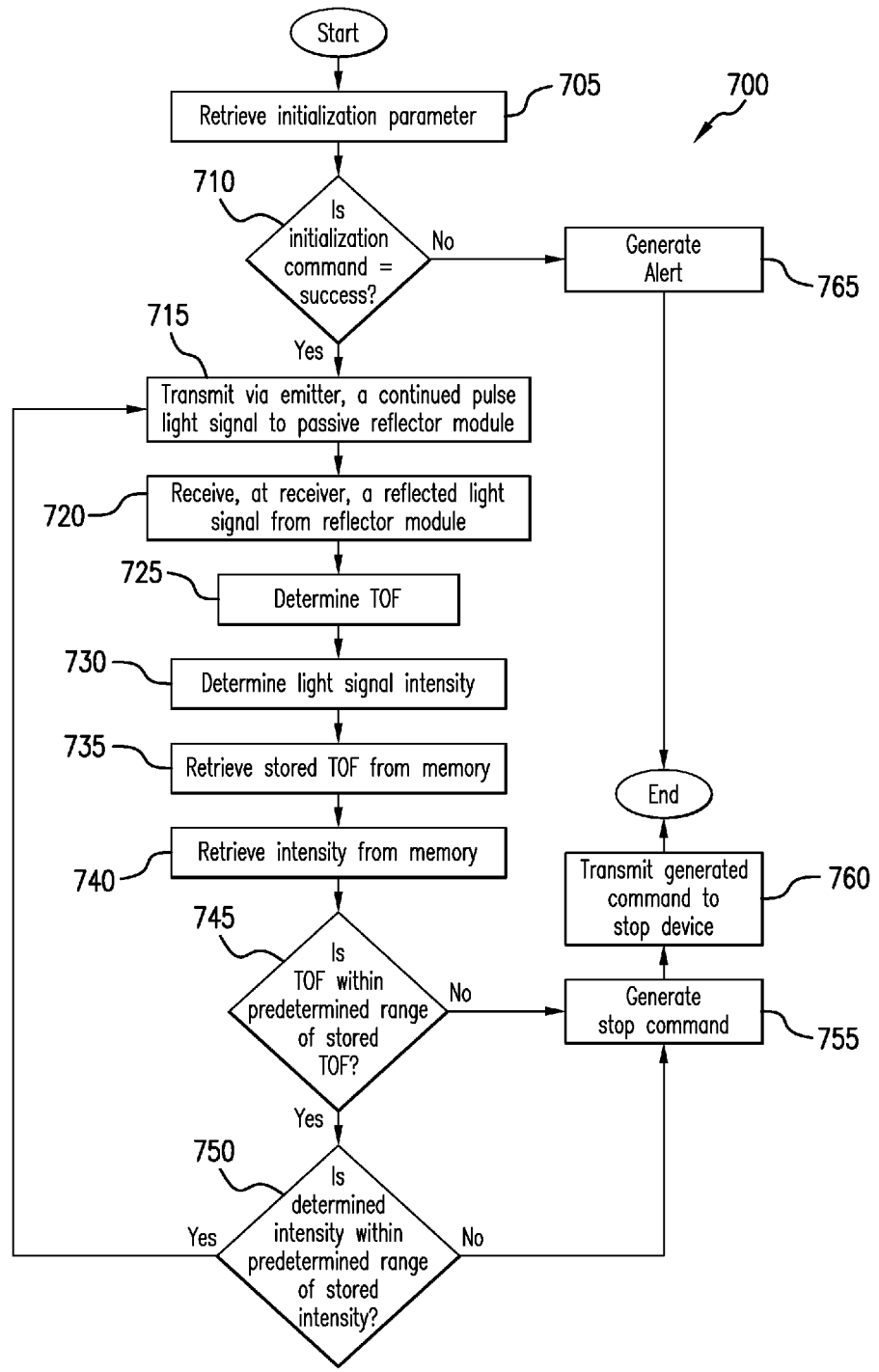
FIG. 7 depicts a detection mode for an exemplary light curtain protection system.

FIG. 7 depicts a detection mode for an exemplary light curtain protection system. With reference to FIG. 3, the detection mode 700 executes at the active optical module 245. The processor 505, with reference to FIG. 5, retrieves, at 705, a stored initialization command. In various embodiments, the initialization command may include data to indicate whether the active module 245 successfully initiated (e.g., no errors detected during startup of the active module 245). At 710, the processor 505 determines whether the initialization command was successful. If, at 710, the initialization command is successful, the emitter 250 transmits, at 715, a light signal towards the passive optical module 205. The light signal may be transmitted in accordance with a predetermined pulse signature to decrease the likelihood of a reflective object entering, with reference to FIG. 1, the light stream 112 undetected. At 720, the receiver receives a reflected light signal from the passive optical module 205. The processor 505, at 725, determines a TOF for the received reflected light signal. At 730, the processor 505 determines a light signal intensity from received reflected light signal.

As depicted, at 735, the processor 505 retrieves a stored TOF from the NVM 515. The retrieved TOF may be the stored TOF from step 635. In some embodiments, a predetermined TOF may be retrieved. At 740, the processor 505 retrieves a stored light signal intensity from NVM 515. The retrieved light signal intensity may be the stored light signal intensity from step 635. The processor 505 determines, at 745, whether the TOF is within the predetermined range of the retrieved TOF. If, at 745, the TOF is within the predetermined range of the retrieved TOF, the processor 505, at 750, determines whether the determined light signal intensity is within the predetermined range of the stored light signal intensity, the processor 505, repeats steps 715-750.

If, at 710, the initialization command is not successful, the processor generates, at step 765, an alert signal. If, at 745, the TOF is not within the predetermined range of the retrieved TOF, the processor 505 generates, at 755, a stop command because an obstruction has been detected. If, at 750, the processor 505 determines the determined light signal intensity is not within the predetermined range of the stored light signal intensity, the processor 505 generates, at 755, a stop command because an obstruction has been detected. At 760, the processor 505 transmits the generated stop command to the machinery 114 to cease operating. In various embodiments, the processor 505, at 760, may transmit the generated stop command to, with reference to FIG. 1, the electrical device 125.

In some embodiments, the step 745 and/or step 750 may require a predetermined number of fails (e.g., determinations of "NO" at steps 745 and 750) before generating a stop command. In various embodiments, the detection mode 700 may only check TOF or light signal intensity. The detection mode 700 may include steps such that both steps 745 and 750 must return a "NO" to generate a stop command. The detection mode 700 may monitor other light signal characteristics, such as, for example, different frequencies.

Although various embodiments have been described with reference to the Figures, other embodiments are possible. For example, in various embodiments, the optical passive module 205 may include a half-wave plate (e.g., half-wave plate 445) to shift polarization of light signal 320a to decrease the likelihood of the receiver 255 capturing a fraudulent light signal. In some embodiments, the emitter 250 and the receiver 255 may be vertically adjacent to each other.

In various embodiments, the emitter 250 may generate a variety of light types. For example, the emitter may generate infrared light signals, flashing light signals, pulsating light signals, or a continuous light signal. The emitter 250 may modulate the light such that the receiver 255 may discriminate against background light. For example, the emitter 250 may transmit a light signal at a predetermined frequency (e.g., 100 kHz). The receiver 255 may include a narrow band filter to only detect a light signal with the predetermined frequency. As such, the receiver 255 may only respond to a light signal with the predetermined frequency thereby decreasing the likelihood of a fraudulent light signal. In various embodiments, the predetermined frequency may vary, in intervals, according to one or more predetermined criteria. The receiver 255 may include a notch filter for capturing, according to the predetermined frequency during a specific time period, a modulated light signal. The predetermined frequency information may be stored in the NVM 515 to be retrieved by the processor 505 as needed.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A light curtain protection system for monitoring a protected field of view, the light curtain protection system comprising:

an active optical module having an emitter and a receiver, the emitter and the receiver disposed adjacent to each other to form a transceiving pair;

a passive optical module configurable to be separated from the active optical module by a detection field, and optically aligned with the active optical module to receive an incident light signal from the active optical module and return a reflected light signal to the active optical module, the passive optical detection module comprising:

a reflector aligned with the active optical module to redirect the incident light signal to form the reflected light signal;

a polarization control module to impart a first predetermined polarization to the reflected light signal such that the reflected light signal received by the receiver corresponds to a second predetermined polarization;

an optical barrier having at least one optical aperture; and, a collimating lens configured to focus the incident light signal, received via the detection field, to the reflector through the optical aperture;

a controller operably coupled to the active optical module; and, a data store operably coupled to the controller, wherein the data store comprises a program of instructions that, when executed by the controller, causes the controller to perform operations to detect an object, the operations comprising:

transmit, via the emitter, the incident light signal towards the passive optical module; and, receive, via the receiver, the reflected light signal from the passive optical module.

2. The light curtain protection system of claim 1, wherein the polarization control module comprises a linear polarizer.

3. The light curtain protection system of claim 1, wherein the polarization control module comprises a half-wave plate.

4. The light curtain protection system of claim 1, the program of instructions further comprises:

retrieve, from the data store, a predetermined time of flight range;

determine, in accordance with the retrieved time of flight range, whether a reflected light signal has been received by the receiver; and, generate, if the reflected light signal has not been received by the receiver in accordance with the retrieved time of flight range, an alert signal indicating an obstruction.

5. The light curtain protection system of claim 1, the program of instructions further comprises:

determine, based on the received light signal, an amplitude of the received light signal;

retrieve, from the data store, a predetermined amplitude range;

determine, based on the retrieved amplitude range, whether the determined amplitude is outside the retrieved amplitude range; and, generate, if the determined amplitude is outside the retrieved amplitude range, an alert signal indicating an obstruction.

6. A light curtain protection system for monitoring a protected field of view, the light curtain protection system comprising:

an active optical module having an emitter and a receiver, the emitter and the receiver disposed adjacent to each other to form a transceiving pair;

a passive optical module configurable to be separated from the active optical module by a detection field, and optically aligned with the active optical module to receive an incident light signal from the active optical module and return a reflected light signal to the active optical module, the passive optical detection module comprising:

a reflector aligned with the active optical module to redirect the incident light signal to form the reflected light signal; and, a polarization control module to impart a first predetermined polarization to the reflected light signal such that the reflected light signal received by the receiver corresponds to a second predetermined polarization;

an optical barrier having at least one optical aperture; and, a collimating lens configured to focus the incident light signal, received via the detection field, to the reflector through the optical aperture.

7. The light curtain protection system of claim 6, wherein the polarization control module comprises a linear polarizer.

8. The light curtain protection system of claim 6, wherein the polarization control module comprises a half-wave plate.

9. The light curtain protection system of claim 8, wherein the half-wave plate comprises a 45 degree fast axis relative to the incident light signal such that the half-wave plate polarizes the reflected light signal by 90 degrees.

10. The light curtain protection system of claim 6, wherein the optical aperture is circular.

11. The light curtain protection system of claim 6, wherein the incident light signal passes through the at least one optical aperture to reach the reflector, and the reflected light signal passes through the at least one optical aperture to return to the active optical module.

12. The light curtain protection system of claim 6, the passive optical module further comprising a baffle arranged between the collimating lens and the optical barrier to direct the incident light signal into the optical aperture.

13. The light curtain protection system of claim 12, wherein the reflector reflects the incident light signal through the optical aperture towards the collimating lens.

14. The light curtain protection system of claim 12, wherein the baffle is formed from non-reflective opaque material.

15. The light curtain protection system of claim 6, wherein the reflector is a corner cube reflector.

16. The light curtain protection system of claim 6, wherein the reflector is a mirror.

17. The light curtain protection system of claim 16, wherein a shape of the mirror includes at least one member of a group consisting of spherical, parabolic or hyperbolic.

18. The light curtain protection system of claim 6, further comprising a passive optical axis extending through the optical aperture and an emitter axis extending through a center of the emitter and a receiver axis extending through a center of the receiver, wherein, when the passive optical module aligns with the active optical module, the passive optical axis extends substantially centered between the emitter axis and the receiver axis.

* * * * *